(12) United States Patent
Thelen et al.

(10) Patent No.: US 6,787,726 B2
(45) Date of Patent: Sep. 7, 2004

(54) RAIL WELDING APPARATUS INCORPORATING RAIL RESTRAINING DEVICE, WELD CONTAINMENT DEVICE, AND WELD DELIVERY UNIT

(75) Inventors: Richard L. Thelen, Eau Claire, WI (US); Richard F. Kral, North Riverside, IL (US)

(73) Assignee: Holland LP, Crete, IL (US)

( * ) Notice: Subject to any disclaimer, the term of this patent is extended or adjusted under 35 U.S.C. 154(b) by 0 days.

(21) Appl. No.: 10/118,481

(22) Filed: Apr. 8, 2002

(65) Prior Publication Data

US 2002/0170884 A1 Nov. 21, 2002

Related U.S. Application Data

(63) Continuation-in-part of application No. 09/554,990, filed on May 23, 2000, now Pat. No. 6,396,020, which is a continuation-in-part of application No. PCT/US98/27169, filed on Dec. 16, 1998.
(60) Provisional application No. 60/069,795, filed on Dec. 16, 1997.

(51) Int. Cl.[7] ............................ B23K 9/00; E01B 11/44
(52) U.S. Cl. .......................... 219/54; 219/125.1; 104/15
(58) Field of Search ........................ 219/53, 54, 125.1, 219/124.34, 137 R; 104/15

(56) References Cited

U.S. PATENT DOCUMENTS

| | | | | |
|---|---|---|---|---|
| 3,308,266 A | * | 3/1967 | Adams, Jr. | 219/137 R |
| 4,672,173 A | * | 6/1987 | Nomura et al. | 219/125.1 |
| 4,929,816 A | | 5/1990 | Theurer et al. | |
| 5,215,139 A | | 6/1993 | Swartz et al. | |
| 5,306,361 A | | 4/1994 | Besch et al. | |
| 5,469,791 A | | 11/1995 | Theurer et al. | |
| 5,575,416 A | | 11/1996 | Oellerer et al. | |
| 5,605,283 A | * | 2/1997 | Lahnsteiner et al. | 219/53 |
| 6,396,020 B1 | * | 5/2002 | Thelen et al. | 104/15 |

* cited by examiner

*Primary Examiner*—Clifford C. Shaw
(74) *Attorney, Agent, or Firm*—David C. Brezina; Barnes & Thornburg LLP (57) ABSTRACT

A rail restraining, robotic welding and weld delivery device uses a frame for supporting a welding head with a clamp for restraining a first rail end and a second rail end and a base twist assembly for aligning said first end and second end. An interconnected weld containment apparatus pivotally connects to the clamp by use of a cam actuated linear pin. This arrangement is operable in an environment in clearance between rails and sufficiently compact that it may be operated from and carried in a truck based on a standard over the road truck or from a container.

19 Claims, 11 Drawing Sheets

RAIL WELDING APPARATUS INCORPORATING RAIL RESTRAINING DEVICE, WELD CONTAINMENT DEVICE, AND WELD DELIVERY UNIT

CLAIM OF PRIORITY

This application is a Continuation-In-Part application and priority is claimed based on Provisional Application Serial No. 60/069,795, filed Dec. 16, 1997, PCT Application U.S. 98/27169 filed Dec. 16, 1998, and Nonprovisional application Ser. No. 09/554,990 filed May 23, 2000, which are incorporated by reference as if fully set forth herein.

BACKGROUND OF THE INVENTION

1. Field of the Invention

The invention is as described herein and shown in the accompanying drawings is for a rail welding apparatus incorporating a railroad rail restraining device, weld containment device, robotic welding head and weld delivery unit having improved rail restraining characteristics, improved weld supporting properties and being compact, lightweight and economical for greater utility. The restraining device enables the positioning of rail ends of either long prewelded rails, special rail sections for appliances such as in frogs or turn-outs or switches, existing rails in need of repair, or a combination of these. Because of the high strength, improved geometry and design, the device can be utilized in the gas-arc welding of highly restricted clearance rail splices or joints, such as in welding a length of rail to a turn-out assembly. The precision of the apparatus disclosed herein is believed to make gas-arc welding of rails in the field feasible, while the disclosures in some of the patents identified above were better suited to laboratory use and were unable to reach success in the field.

2. Description of Related Art

In the prior art, there are three main ways to weld railroad track. These include aluminothermic welding (U.S. Pat. Nos. 5,215,139 and 5,306,361), flash-butt welding (U.S. Pat. Nos. 4,929,816; 5,270,514; and 5,469,791); and gas-arc welding (U.S. Pat. No. 5,605,283). These all have certain advantages and disadvantages. Aluminothermic welding has low equipment requirements, is economical to perform but produces welds of less strength than the other methods. Flash butt welding uses complex equipment but produces high strength welds, however it is difficult to use to join rails in the field, and results in a loss of rail length, which can cause difficulties. Gas-arc welding requires precise alignment and a considerable length of time to perform a weld of sufficient strength, heretofore also requiring equipment of considerable size, complexity and cost. Gas-arc welding has been taught in U.S. Pat. Nos. 5,605,283, 5,773,779 and 5,877,468 as well as other patents based upon those disclosures. The disclosures in U.S. Pat. Nos. 5,605,283, 5,773,779 and 5,877,468 are incorporated by reference as if fully set forth herein. U.S. Pat. No. 5,605,283, shares common ownership with the instant application. The invention enables the use of gas-arc welding with greater ease and lower cost and with commercial viability where the teachings in certain of the above patents were unable to obtain repeatable results in actual use in the field.

SUMMARY OF THE INVENTION

The rail restraining device, weld containment device, robotic welding head and weld delivery unit of the invention needs to handle rail sections often as long as or longer than 1800 feet, aligning rail ends precisely for welding, yet can be made sufficiently compact to be incorporated on a transport device such as a hi-rail equipped over-the-road truck or shipping container on a chassis or car having economy or equipment for over-the-road use while being sufficiently small sized itself to fit in the space available to weld rails even in switches or turnouts or in frogs where the weld joint is separated from the adjacent rail portion by as little as about 7" to 11".

The rail restraining device or devices and weld delivery unit take up a sufficiently small volume of space that the truck can be fitted with room for the welder itself; control devices; boom; generator; induction heater; and gas bottles; as well as one or more portable welding robots.

Other and further objects of the invention will be obvious upon an understanding of the illustrative embodiment about to be described, or will be indicated in the appended claims and various advantages not referred to herein will occur to one skilled in the art upon employment of the invention in practice.

DETAILED DESCRIPTION OF THE PREFERRED EMBODIMENT

The description which follows, and the embodiments described therein, are provided by way of illustration of an example, or examples of particular embodiments of the principles of the present invention. These examples are provided for the purposes of explanation, and not of limitation, of those principles and of the invention. The drawings are not necessarily to scale and in some instances proportions may have been exaggerated in order more clearly to depict certain features of the invention.

The rail welding fixture consists of the rail restraint assembly 1, the weld containment device 290 and the welding robot 500. The weld containment device 290 prevents the molten metal from flowing out of the web and head areas during the welding. In a sense, this device is an automatically positionable and removable mold for welding. The weld delivery unit 100 houses the robotic controller and boom, as well as other ancillaries such as generator, welder, other controllers, induction heater, pumps, gas bottles, tools, etc. The weld delivery unit 100 also stores one or more portable welding robots 502, rail restraints 1 and containment devices 290 when not in use.

The rail welding fixture in a prototype and alternative embodiment has rail restraint 1 (FIGS. 1–3) which provides the structure on which a fixed clamp 2 and movable clamp 3 are mounted in pairs. One of said clamp pairs will engage the end of each of the respective rail sections to be welded. The preferred embodiment will be described in greater detail insofar as its elements may be delineated. The alternative embodiment has several features which may be advantageously adapted to other embodiments, although the preferred embodiment uses, for example, hydraulic rather than mechanical actuation. In certain circumstances, the mechanical actuation described herein may be advantageous.

Figure 1:
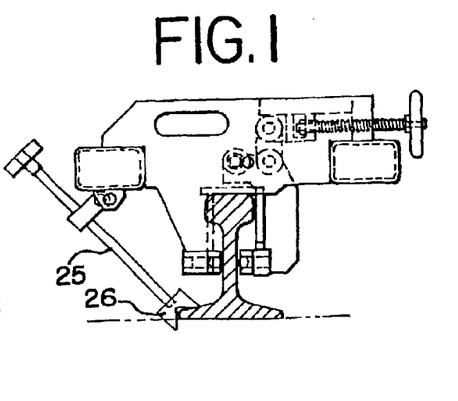
FIG. 1 is a front elevation of an alternative embodiment of the rail restraining device.
Figure 2:
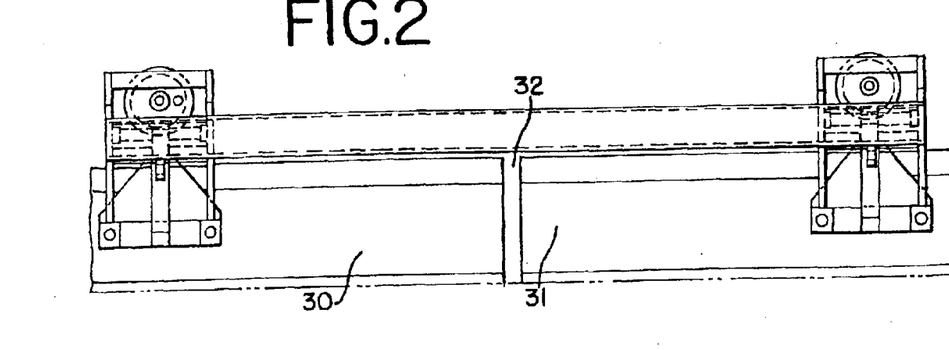
FIG. 2 is a side elevation of an alternative embodiment of the rail restraining device.
Figure 3:
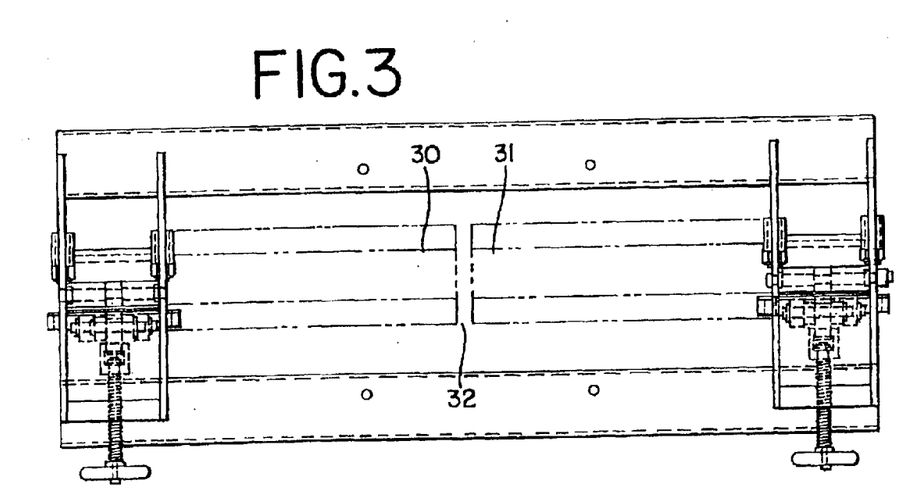
FIG. 3 is a top plan view of an alternative embodiment of the rail restraining device.

In this alternative embodiment, moveable clamp member 3 has an eccentric pivoting action around pin 7 which can be clamped in place by the action of handwheel 11 fastened to screw 6 with wheel locking mounting 12, thence acting in turn on clevis pins 5 and 9 through link pin 8 and link 4 and rollers 13, fastened by nut 14. This acts through bushing 10 ultimately on the pad 16 carried on ball 15 providing clamping action on the web of the rail. A horizontal plate supports the device on the crown of the rail.

Another alternative feature relates to alignment of the rails' ends to line up their respective center lines as accomplished through the clamping force on each of the four pads on the respective two clamps. Rails may also be distorted and out of line in a twisting manner. The respective clamps are provided with a base twist assembly 17 mounted on one of the frame members of the rail welding fixture. The rail welding fixture components are mounted with a variety of fasteners 18–24.

In this alternative embodiment, base twist assembly 17 bears at an angle through a shaft 25 on a pad 26 that engages the base 27 of the rail 28. In this manner, the two rail ends 30, 31 can be precisely aligned both with a calculated gap 32 and in vertical and transverse directions to enable the next step of the operation utilizing the weld containment device.

The second component in the preferred system is the weld containment device 290 which works integrally with the rail restraint 201, fitting on or being inherently part of frame 270 thereof. While preferably used together, and providing unique advantages in combination, weld containment device 290 may be suitable for other welding operations, merely providing its advantages in compactness and rapid deployment.

The weld containment device 290 (FIGS. 4–5) is a part of rail restraining assembly 201, specifically being mounted (FIG. 12) on four locating pins 286 on frame 270. It is loosely secured to the rail restraint 201 using four clamps 287 which allows the weld containment device 290 to automatically center itself when the cooling blocks 310 are deployed.

Figure 4:
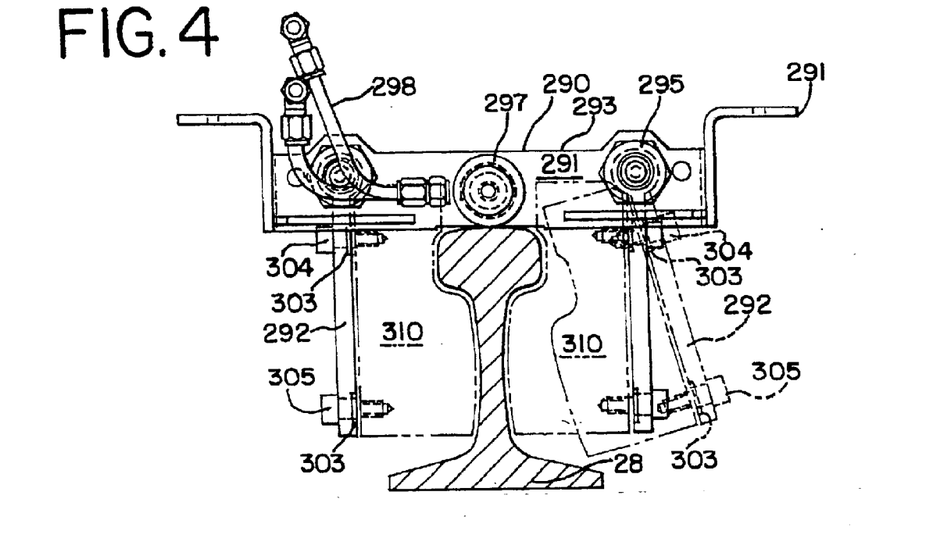
FIG. 4 is a front elevation of the rail weld containment device.
Figure 5:
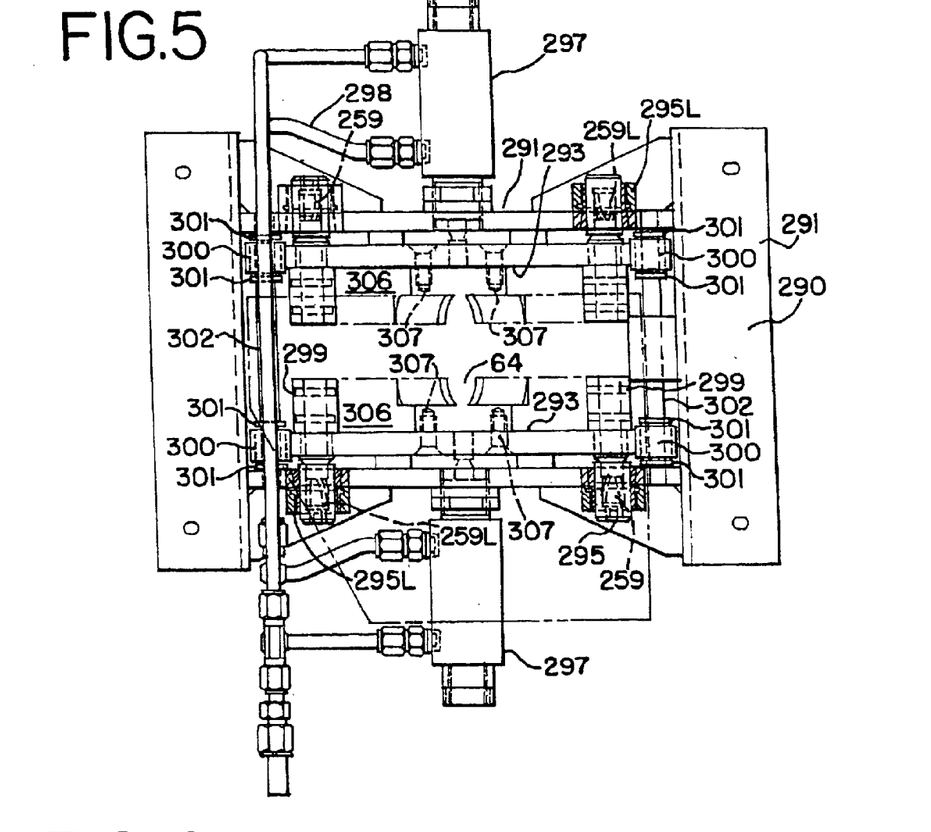
FIG. 5 is a top plan view of the rail weld containment device.

The weld containment device 290 is set up on a rigid frame 291. Two yokes 293 are actuated by a pair of cylinders 297 mounted exterior to frame 291 and the cylinder rods are connected to the yokes 293 causing them to move inwardly. Cylinders 297 are operated through pressure transmitted in hydraulic fittings 298 in the ordinary manner of hydraulic operation. The yokes are mounted on two linear bearings or bushings 300 secured to the yoke using shoulders 301. Other fasteners, such as snap rings, might be suitable, but need to have adequate strength. The bearings 300 slide on two hardened steel shafts 302. The shafts cause the motion of the yoke to be precisely linear and parallel with each other.

A twist pin 259 is rigidly connected to the block holders 292 through the use of pins 299 preventing rotation of the twist pin 295. Cooling blocks 310, preferably constructed of copper, are connected to the block holders 292 by a plurality of fasteners 304 and 305. The cooling block 310 and block holder 292 are the major components in the swinging components referred to generally as the quadrants 294.

A smaller non-moving cooling block 306 is held to the frame 291 by a plurality of fasteners 307. As the cylinder extension causes the motion of the yokes inward from the open position to the closed position, the action of the twist pins 259 engaged by the cam guide 296 causes a rotation of the quadrants 294. The scope of the swing may be as little as about 15 degrees to about 30 degrees with about twenty degrees currently preferred.

In the preferred embodiment, in FIGS. 4–5 and FIGS. 15–19, adjustment of the precise rotation of the cam guides 296 is provided through the use of an adjustable hub device 295. This device 295, which is commercially available and is sold under the trademark Trantorque, uses twin tapered shaft segments 308, 309 to impinge on the cam guide 296 while at the same time impinging on the hole in the frame 291. This operates in a manner analogous to a collet, release of the load on the tapered shaft segments 308, 309, by loosening adjusting nut 311, permitting movement of the guides 296.

Precise adjustment of the cam guides 296 provides for a tightening effect as the blocks 310 contact the rail on the extend stroke. A compliant fit of the blocks 310 against the rail 28 is provided by a pair of springs 303 in each block.

Cooling blocks 310 and 306, when in place on the rail, provide for a welding head aperture 314 through which the welding head can fill the rail web and head as described below, even when the blocks are closed and the shoe quadrants touch on the extend stroke.

During the return stroke, the yoke 293 pulls the quadrants 294 back by engaging a shoulder 317 on the twist pin shaft 318. This shoulder 317 holds the quadrant in relative proximity while still allowing a rotation about shaft 318. Since the twist pins 259 are fixedly fastened to the quadrants, parting of the containment shoes is accomplished by pulling the pins apart. The clearance is preferably somewhat less than about one and one half inches (1.5") thereby providing access to the rail gap 32 of about 1 to 3 inches, yet providing a level of preload on the yoke and quadrant arrangement.

Figure 8:
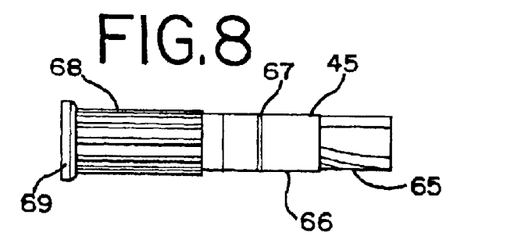
FIG. 8 is a side elevation of the guide rod of an alternative embodiment of the weld containment device.
Figure 9:
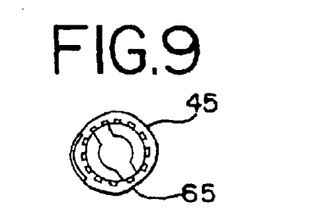
FIG. 9 is a front elevation of the guide rod of an alternative embodiment of the weld containment device.

An early prototype pin or rod 45 for right hand travel is shown in FIGS. 8 and 9. Cam portion 65 has twist to provide 30 degrees rotation in ¾ to 1¾ inches of travel. Shaft portion 66 is provided with groove 67 to receive ring 53. Knurled or splined portion 68 abuts head 69. Preferably about thirty two teeth will be formed in splined portion 68. Head 69 fits in aperture 70 in holder 72. A press fit into aperture 70 is anticipated. At the quadrant end, set screw 52 also serves to firmly fix the unit in position. In certain embodiments, a large number of small profile splines could be used with mating splines in the frame 291 to enable some level of adjustment by removal and replacement at a different alignment. This would enable mechanical adjustment but would be limited in the increments available by the size and number of splines. The preferred arrangement permits adjustment in infinite increments and is expected to be adjustable in the field.

Figure 10:
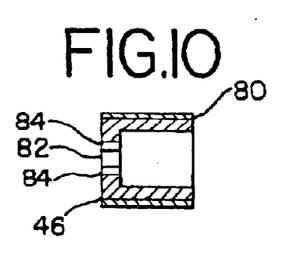
FIG. 10 is a side elevation of the cam guide of an alternative embodiment of the weld containment device.
Figure 11:
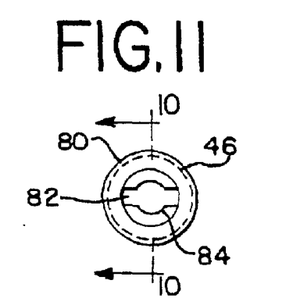
FIG. 11 is a front elevation of the cam guide of an alternative embodiment of the weld containment device.

The early prototype cam guide 46 in FIGS. 10–11 has a body portion 80 and aperture 82 with opposed lobes 84 receiving cam portion 65. Lobes 84 could be formed with a profile enabling them to receive either the right or left hand cam portions 65. For improved strength and precision, however a left and right cam guide could also be provided.

The preferred twist pin 259 (FIG. 16) is designed to have about 15 degrees of rotation in about ¾ to 1¾ inches of linear travel. This limit has been evaluated as an operative range, however, as of the filing date of this application, it is believed that 20 degrees may be preferred. The difference in the drawings is not expected to be significant in light of the disclosure herein of the prototype which used 30 degrees of rotation in the same length of travel. One set of twist pins 259 and cam guides 296 will have right hand travel and the other set 259 L and 296 L left-hand travel (FIG. 5).

Preferred twist pin 259 and cam guide 296 for right hand travel is shown in FIGS. 16–19. Cam portion 315 is shown having a twist of 15 degrees rotation in three quarters inch (¾") travel. As described above, 20 degrees may be preferred. Shaft portion 316 is provided with a shoulder 317. Shaft end 318 provides for insertion into the block holders 292 and through bushing 297 and securement with pins 259.

Figure 18:
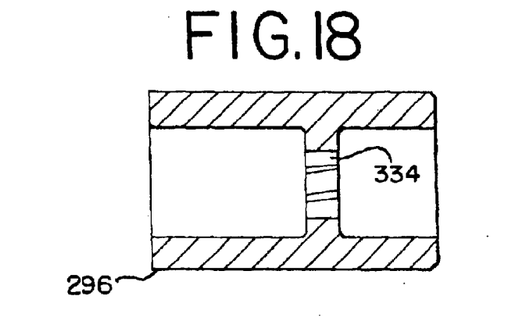
FIG. 18 is a side elevation of the preferred cam guide of the weld containment device.
Figure 19:
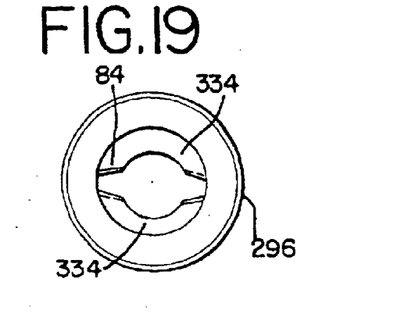
FIG. 19 is a front elevation of the preferred cam guide of the weld containment device.

Cam guide 296 has a body portion 330 aperture 332 with opposed lobes 334 receiving cam portion 315. Preferably lobes 334 can be formed with a profile enabling them to receive either the right or left hand cam portions 315. For improved strength and precision, however a left and right cam guide could also be provided. The degree of twist will conform to that of the corresponding pin 259, 259 L.

Unlike the prior art, this geometry for operating quadrants 294 permits operation in very close clearance locations. The combination of longitudinal movement of yokes 293 into and out of engagement and the outward swinging of block holders 292 on horizontal, longitudinally aligned shafts 302 and pins 259 enables adequate clearance for the welding head to move reciprocally and vertically to weld the rail bases together, while closing the blocks to maintain the welding material in the web, and thence such clearance as is necessary to weld the head of the rail. This movement provides for both effective welding and compact size. Previously difficult to gas arc weld locations such as rail in turnouts and frog joints can be welded, when they could not easily be welded under prior art apparatus, methods, or fixtures.

The blocks 310 conform to the profile of the rail 28 for the purpose of containing molten material as the weld progresses. The welding operation will be accomplished by the following steps: placing a ceramic base mold below the rail base and then commencing the welding operation whereby approximately a 1 to 3 inch gap between the rail ends is filled by welding material.

Using a continuous precisely controlled welding cycle will move the welding element back and forth across the gap resulting in the filling of the gap with metal material having mechanical properties commensurate with that of the metal in the rail itself. To control this weld, the transverse distance the welding element will travel at the base being a long distance, while only a short distance of travel is necessary in the web portion, the blocks will be swung out of the way of the welding element at the beginning of the weld. As the welding operation progresses in a vertical manner through the web of the rail, the blocks will be closed on the web to maintain the molten material in place. The weld will progress up the web while the blocks provide the required containment yet also providing the necessary clearance for the welding element. This movement can be controlled and coordinated by processing data on positioning and the like received from a robotic controller.

A specific welding procedure will be a function of the welding unit used, which is not a part of this invention. For example, arc welding could be used, while theoretically, gas welding, aluminothermic bonding, electroslag, portable foundry or thermite welding may be adapted to take advantage of certain aspects of the invention, such as the rail restraint, portable welding robot or weld containment. The preferred welding method would be arc welding. However, great flexibility is provided by the invention adaptable to the metallurgy of the rails, the equipment available, and the equipment in operation at any particular time.

Figure 6:
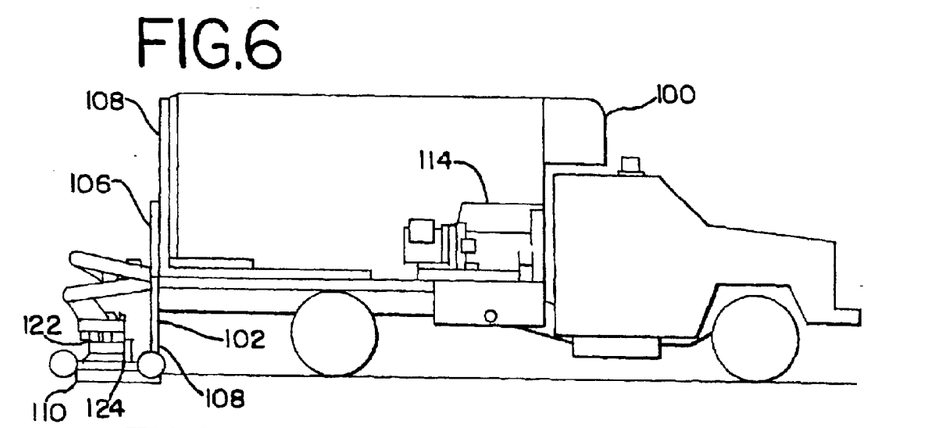
FIG. 6 is a sectional view of an alternative embodiment of the weld delivery unit.
Figure 7:
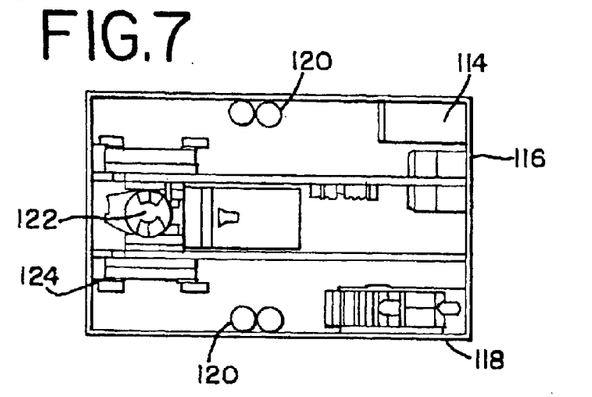
FIG. 7 is a top plan view of an alternative embodiment of the weld delivery unit.

One possible weld delivery unit 100 alternative, shown in FIGS. 6–7, will have a frame 102 mounted in truck 104. A vertical support piece 106 fits sliding rack 108. Vertical support piece 106 at its lower portion 108 supports horizontal cradle 110 adapted to have rail engaging bogie wheels 112. Thus, the device can be raised for transportation, maintenance, or the like, and lowered for alignment on the railroad rails to reduce the load on the structure and steady the unit for operation and enable indexing to an adjacent continuous rail, the welds along any given section of rail being staggered as between the left and right rails.

Figure 24:
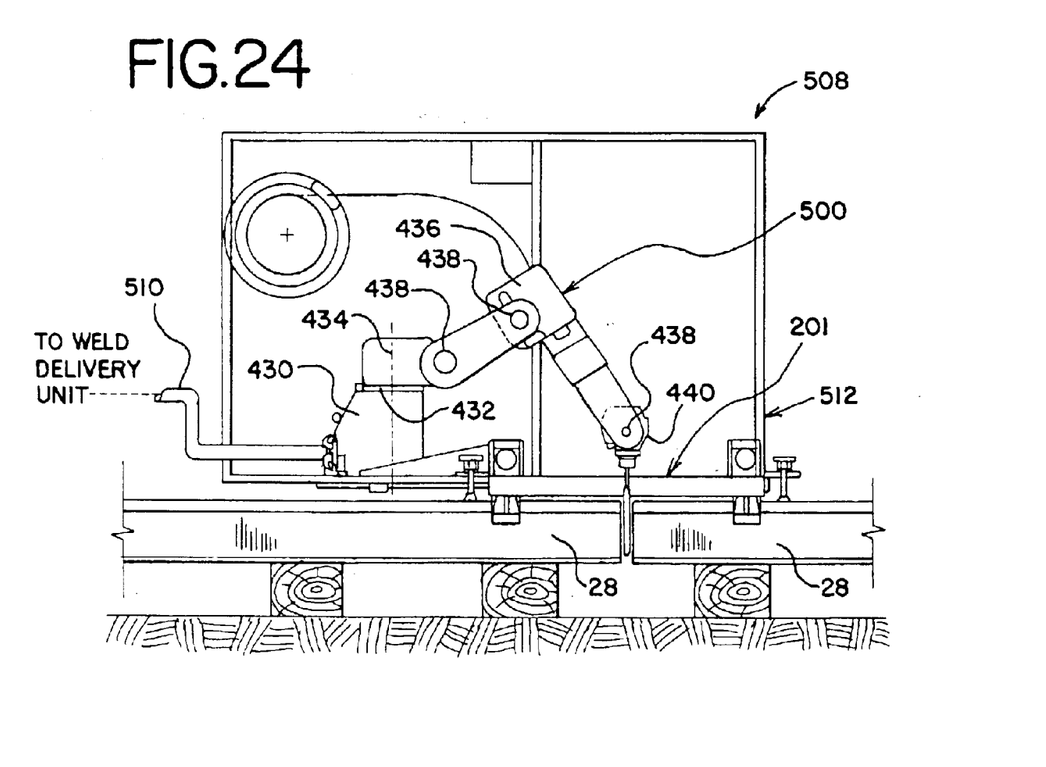
FIG. 24 is a side elevation of the preferred rail restraint with robotic welding device.
Figure 25:
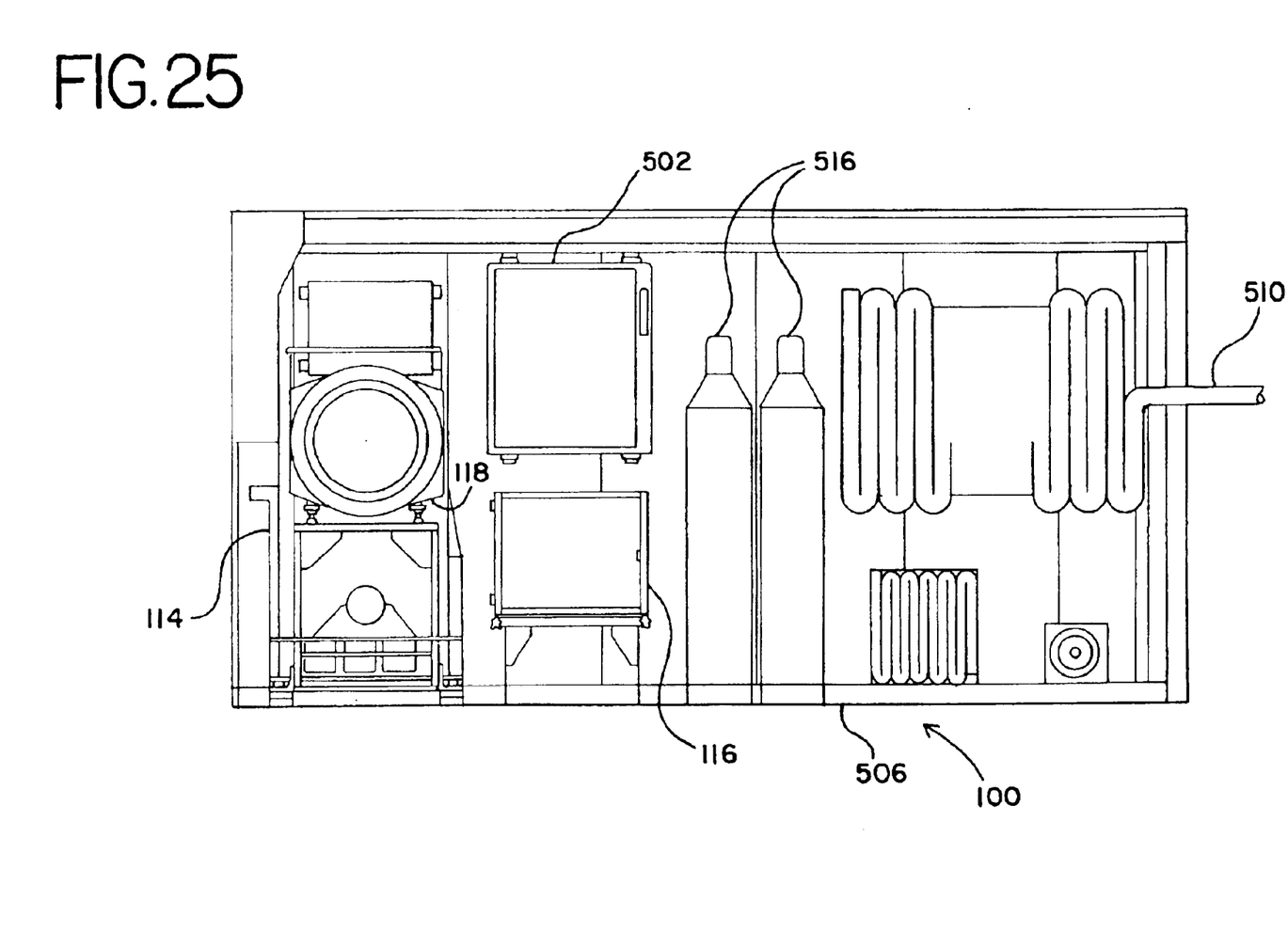
FIG. 25 is a sectional view of an embodiment of the van supporting the weld delivery unit using a separate robot.

The weld delivery unit 100, as shown in FIG. 25, has sufficient space to receive the welder 114 itself; control devices 116 generator 118, induction heater 502, boom not shown and shielding gas 516; as well as the welding robot 500 shown in FIG. 24 stored on the unit 100 retracted in the body of the truck for protection and ease of transportation.

As taught in FIGS. 6–7 the alternative weld delivery unit is basically indexed to the rails 28 by virtue of cradle 110 and bogie wheels 112. This provides an advantage in quick movement and lack of bracing or other connection to the roadbed. In certain conditions this type of alignment could have significant utility.

The preferred weld delivery unit 100, shown in FIG. 25, will essentially be a welding skid 506 mounted in a transport vehicle such as a truck 104. Equipped with a boom not shown, the weld delivery unit 100 can deploy the rail restraint 201, the weld containment device 290 and the portable welding robot 500 which together are called the robotic welding head 508. The robotic welding head 508 has a welding range from the weld delivery unit 100 that is only limited by the length of the umbilical 510 which supplies the robotic welding head 508 with commands, power and coolant.

The preferred rail welding fixture 200 has a rail restraint 201 (FIGS. 12–14) which provides the structure on which the fixed clamp and the movable clamp are mounted in pairs. One of said clamp pairs would engage the end of each of the respective rail sections to be welded. Fixed clamp 202 has downwardly depending arm 205 with a clamping member including a pad 223 that provides a base against which the rail 28 can be clamped, and provides the requisite electrical contact as may be required by the welding operation. These are paired for each clamp assembly.

Figure 12:
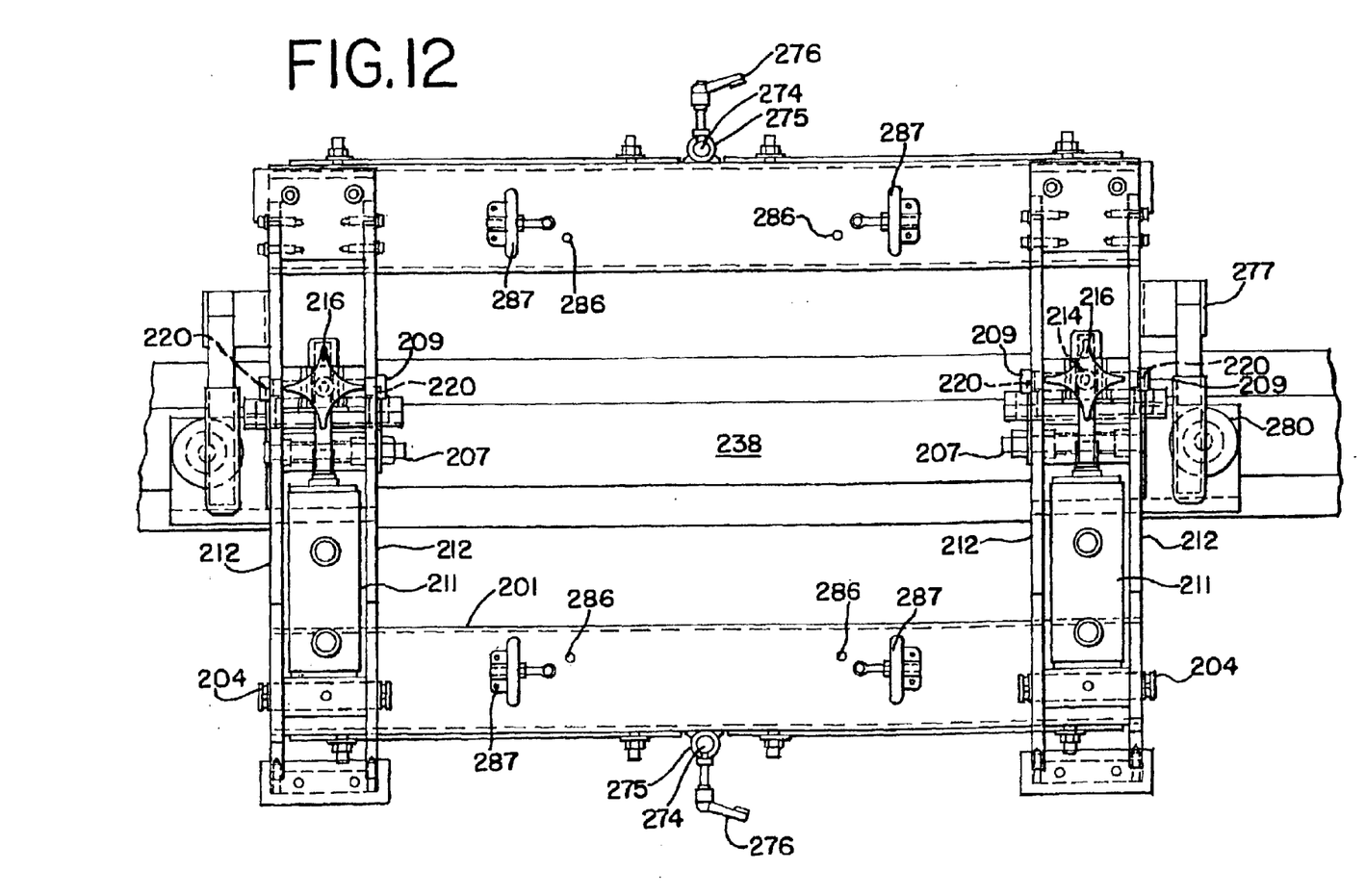
FIG. 12 is a top plan view of the preferred rail restraint device.
Figure 13:
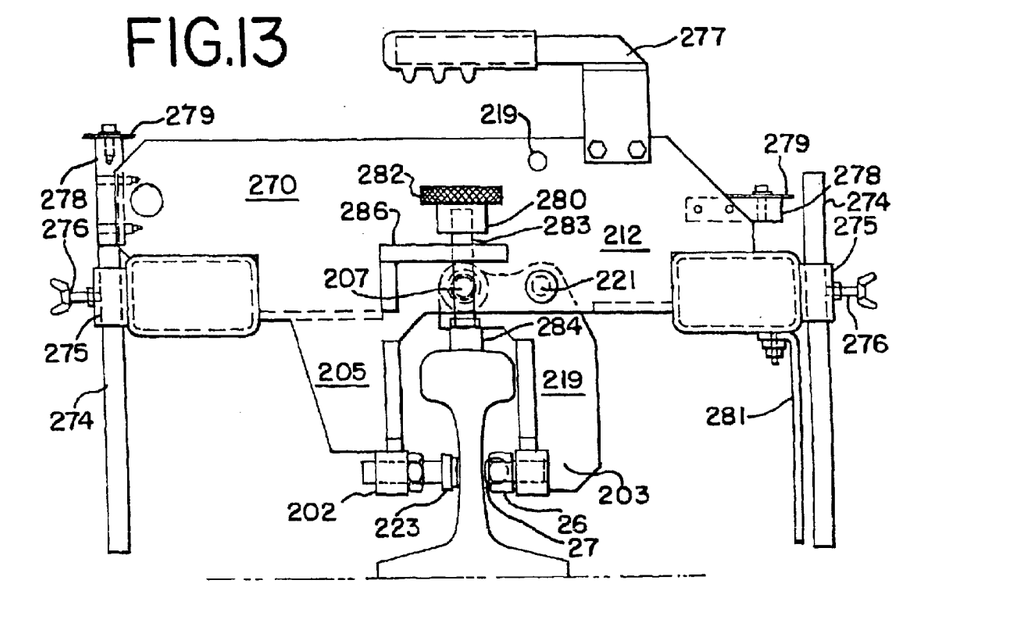
FIG. 13 is a front elevational view of the preferred rail restraint device.
Figure 14:
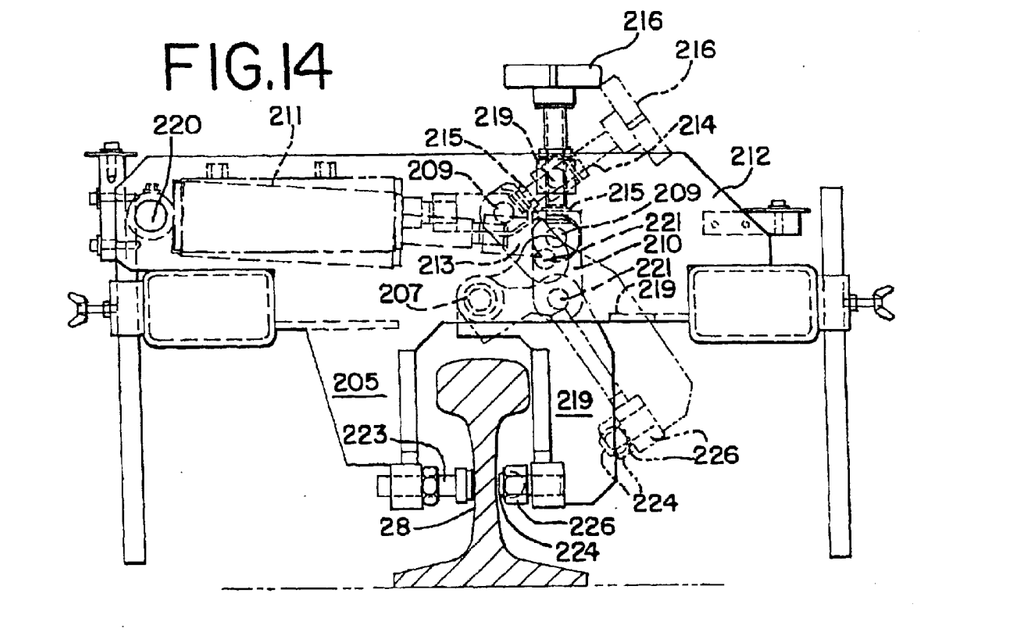
FIG. 14 is a sectional view of the preferred rail restraint device showing the clamping arms in open and closed positions.
Figure 15:
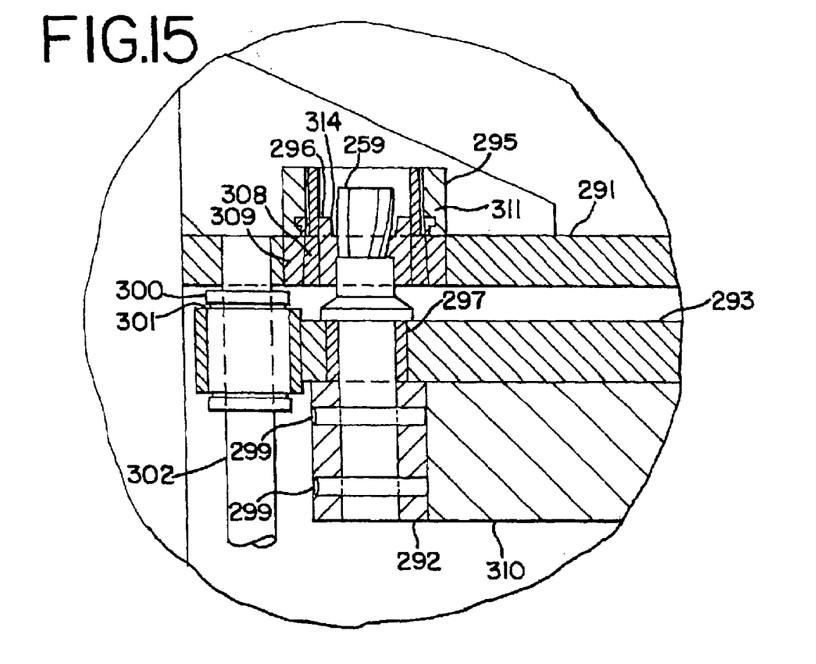
FIG. 15 is an enlarged section of the twist pin and cam adjustment of the weld containment device.
Figure 16:
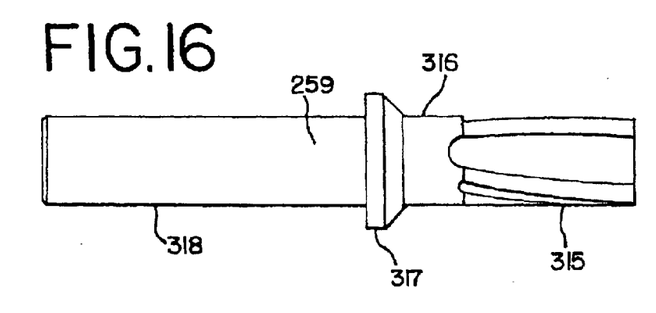
FIG. 16 is a side elevation of the preferred twist pin of the weld containment device.
Figure 17:
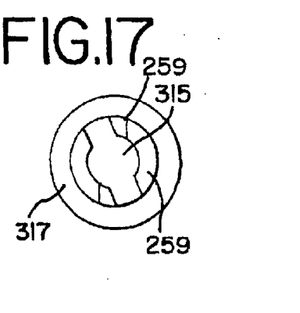
FIG. 17 is a front elevation of the preferred twist pin of the weld containment device.

The movable clamp member 203 with downwardly depending arm 219 has an eccentric pivoting action around pin 207 which can be clamped in place by the action of a cylinder 211. The rod 225 of cylinder 211 is fastened to a clevis 208 and pinned to a link 210 with a pin 209. The rotation of link 210 is constrained by link adjustment assembly 213 which is composed of a rotating structural beam 212, a screw 214 penetrating through the beam 212 with a rotary joint 215 connected to the clevis 208 and pin 209 using a block 217. Block 217 rotates around pin 209. The force applied by the cylinder acts through the clevis pin 209 with a variable reaction force taken by the shoulder bolts 220 directing a clamping force downward against moveable clamp. The structural beam 212 is held in the rail restraint 201 using shoulder bolts 220.

It will be seen that said arm 203 has an inverted L shape with pin or pivot 207 being located proximate the end of the short leg of the L. Pin 221 provides the second pivot, this being located proximate the intersection of the short leg of the L and the long leg of the L. Clamping pad 225 is located at the end of the long leg of the L.

The length of this link adjustment assembly 213 is controlled by rotation of a handwheel 206 attached to the screw 214. The length of the final adjustment length of the link adjustment assembly 213 is held in place using check nut 222 for locking.

Link adjustment assembly 213 provides one arm in a scissors arrangement with link 210 providing a second arm and the top portion 218 of clamp 203 a third. The extension or retraction of cylinder 211 acting on pivot 209 results in the pivoting of link adjustment assembly at pin 209 and bolts 220. Link 210 pivots at pins 209, 221 and portion 218 around pins 207, 221 results in exertion of a substantial clamping force owing to the fixed positions of pins 207 relative to bolts 220 in beam 212.

The force applied by the cylinder acts through the clevis pin 209 with a variable reaction force taken by the shoulder bolts 220 directing a clamping force downward against moveable clamp 203 and carried on ball unit 224 fastened by nut 226. The cylinder is mounted in the beam 212 of restraint 201 with cylinder mounting pins 204.

Stabilizing legs 274 are adjustable and provide additional stability of the rail restraint support. The legs 274 are allowed to slide in the bushing 275 and held in place with setscrews 276 which may alternatively be actuated with wingnuts (FIG. 13) or handles (FIG. 12) or other appropriate manual gripping end. The rail restraint 201 is lowered into place by use of the boom located on the weld delivery unit 100.

By comparison to the alternative embodiment, the use of legs 274 provides a platform fixed relative to the ground or roadbed. This enables the use of various bars, clamps and jacks, familiar to one in the track art, which may be hooked or otherwise fixed to a rail and jacked against the ground or roadbed to directly control twist. In addition to the greater precision of alignment this also enables track workers to use familiar alignment and adjustment tools as may be necessary to specific jobs.

Depending on the type of welding robot used, touch sensing plates 279 may need to be attached to blocks 278 which are attached to the frame 270 to allow the robotic controller to establish the location of the rail restraint 201 and thence the weld gap by touching the plates with an electrically live torch tip. Pluralities of these plate assemblies are mounted on the frame 270 for accurate location of the weld gap. Around the perimeter of the frame 270 are located a plurality of windscreens or flaps 281 for prevention of ambient winds affecting the gas shield of the welding process.

Figure 23:
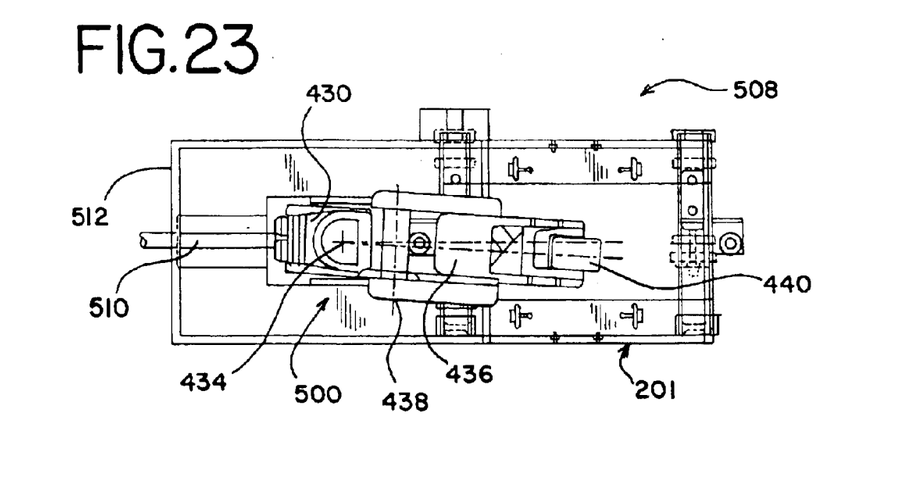
FIG. 23 is a top plan view of the preferred rail restraint with robotic welding device.

When the preferred portable welding robot 500 is used, as shown in FIGS. 23–25, and attached to the rail restraint 201, the touch sensing plates are unnecessary since they are a single unit and the robot welder no longer needs to orient itself to the rail restraint 201. Also when the portable welding robot 500 is attached to the rail restraint 201, the robotic welding head 508 can be enclosed in an environmental protection shield 512.

The rail restraint 201 is supported on the rail using jacking screw assemblies 280 in which handle 282 rotates screw 283 mounted in a fixed horizontal plate 286 by threading, and having rotary shoes 284 attached to the end of screw 283. Shoe 284 is positioned so as to be centered on and bear against the head of the rail 28. In this manner, clockwise rotation of a right hand threaded screw 283 will raise rail restraint 201.

Improvements in the preferred embodiment when compared to our earlier prototype include the use of the hydraulic cylinder 210 and scissors mechanism; use of adjustable legs 274 and screw assembly 280 and addition of the portable welding robot 500 and environmental protection shield 512 for superior weld control.

The preferred weld delivery unit 100 (FIG. 25) will consist of a welding skid 506 that can be attached to a common truck chassis specially equipped to be operable on railroad rails by use of front and rear rail-engaging bogies. Mounted on the truck chassis is a van-style cargo box, which houses and protects all of the associated process equipment. The process equipment includes a welder 114, a portable welding robot 500, a robot controller 116, and an induction heating system 502. Alternatively, the welding skid 506 can be used as a stand alone unit or can be mounted in a transport container or other device that can be moved to the welding site.

Figure 21:
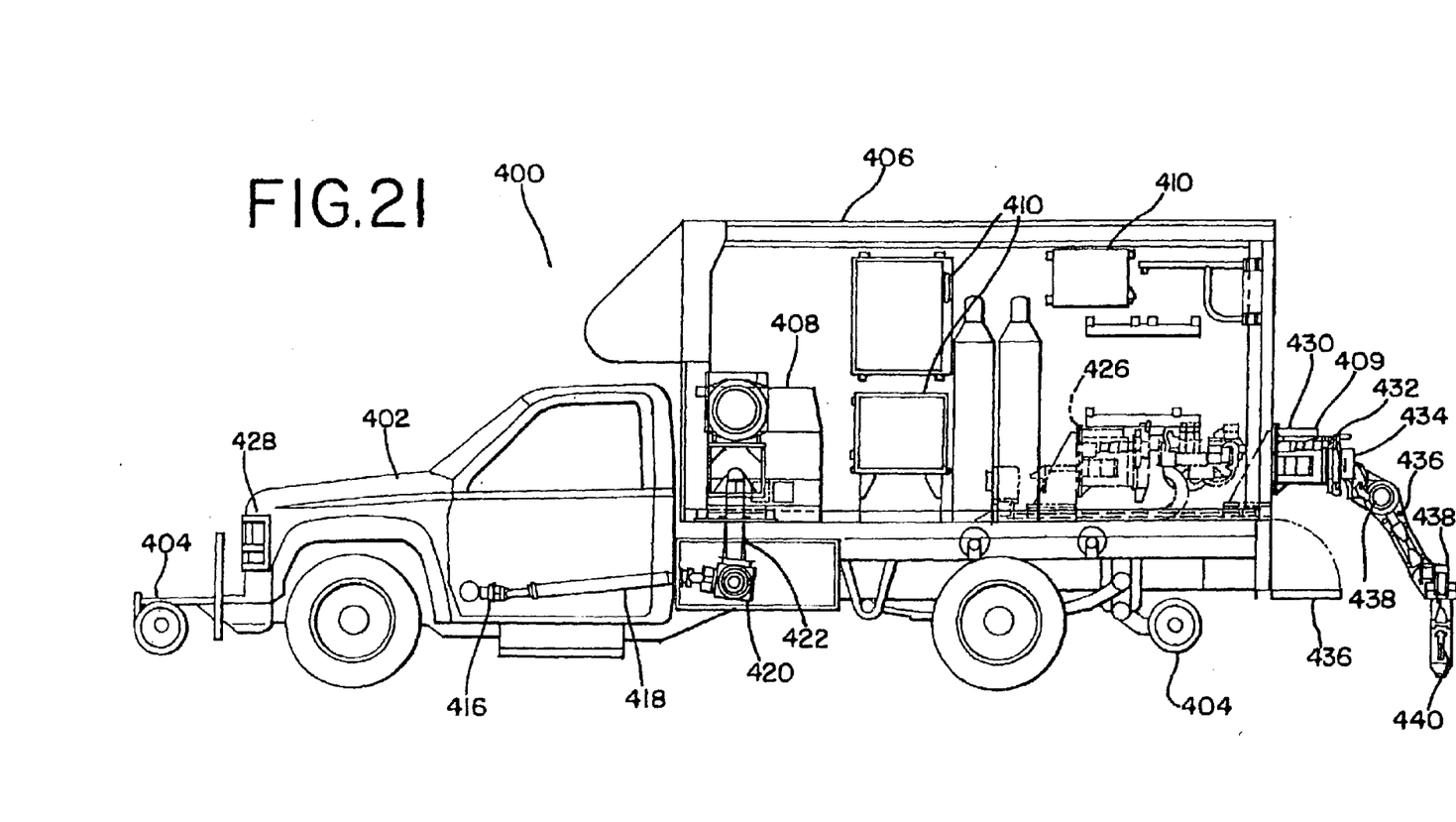
FIG. 21 is a side sectional view of the alternate embodiment of the weld delivery unit.
Figure 22:
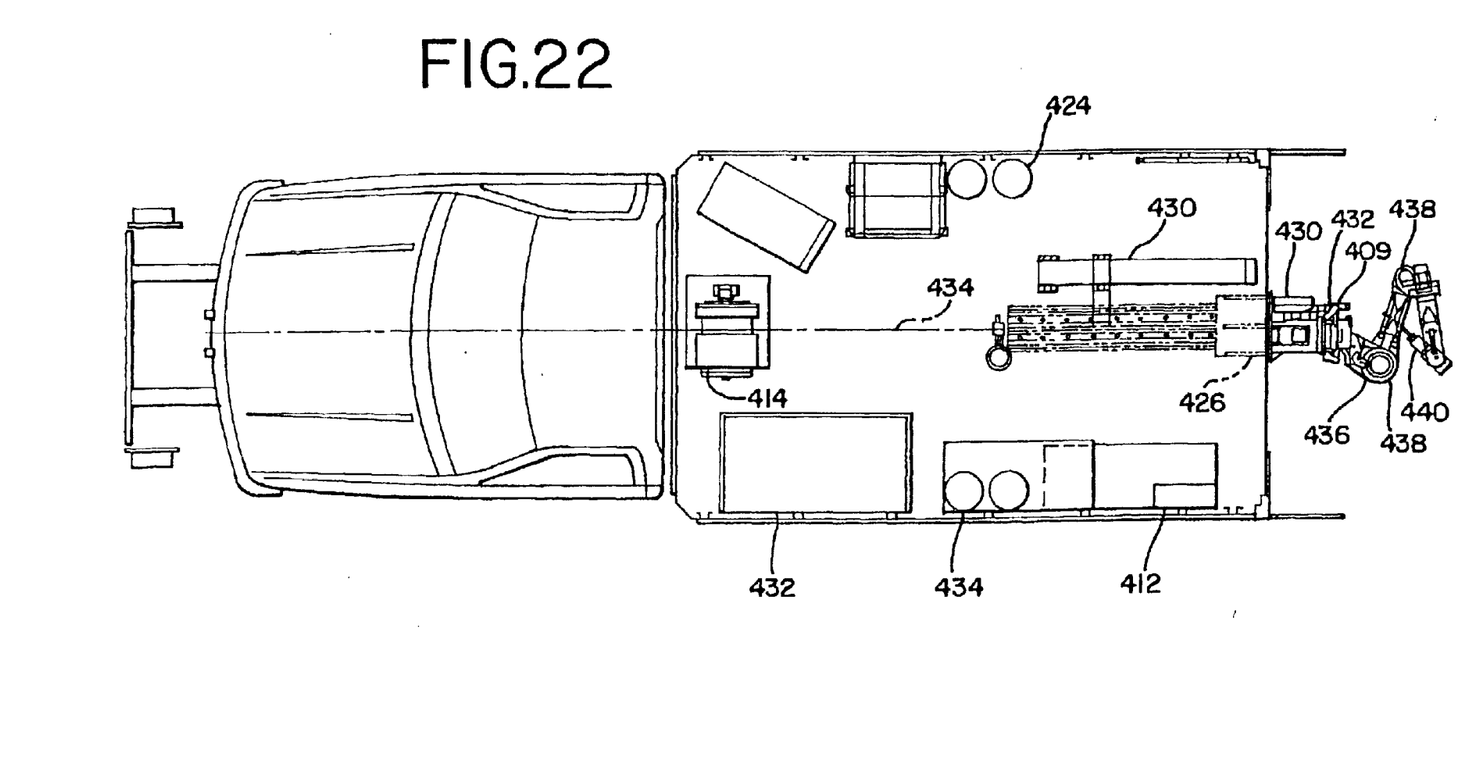
FIG. 22 is a top plan view of the alternate embodiment of the weld delivery unit.

Auxiliary equipment includes an electric power generator 118, driven from the truck engine through a power take-off transmission 416, as shown in FIG. 21, and drive shaft 418 through a right angle gear box 420 and a belt drive 422. Alternatively the generator 118 can be powered by a separate gas engine. Gas bottles 516 for welding shielding gas are also provided. A hydraulic system 428 which can be belt-driven from the truck engine provides hydraulic power to operate the rail restraint 201 and weld containment device 290. Various tools and devices to assist in alignment of the rail are also stored on board in tool case 432 and storage rack 434. A drop-down tool shelf 436 allows for temporary storage of frequently used tools and supplies.

Figure 20:
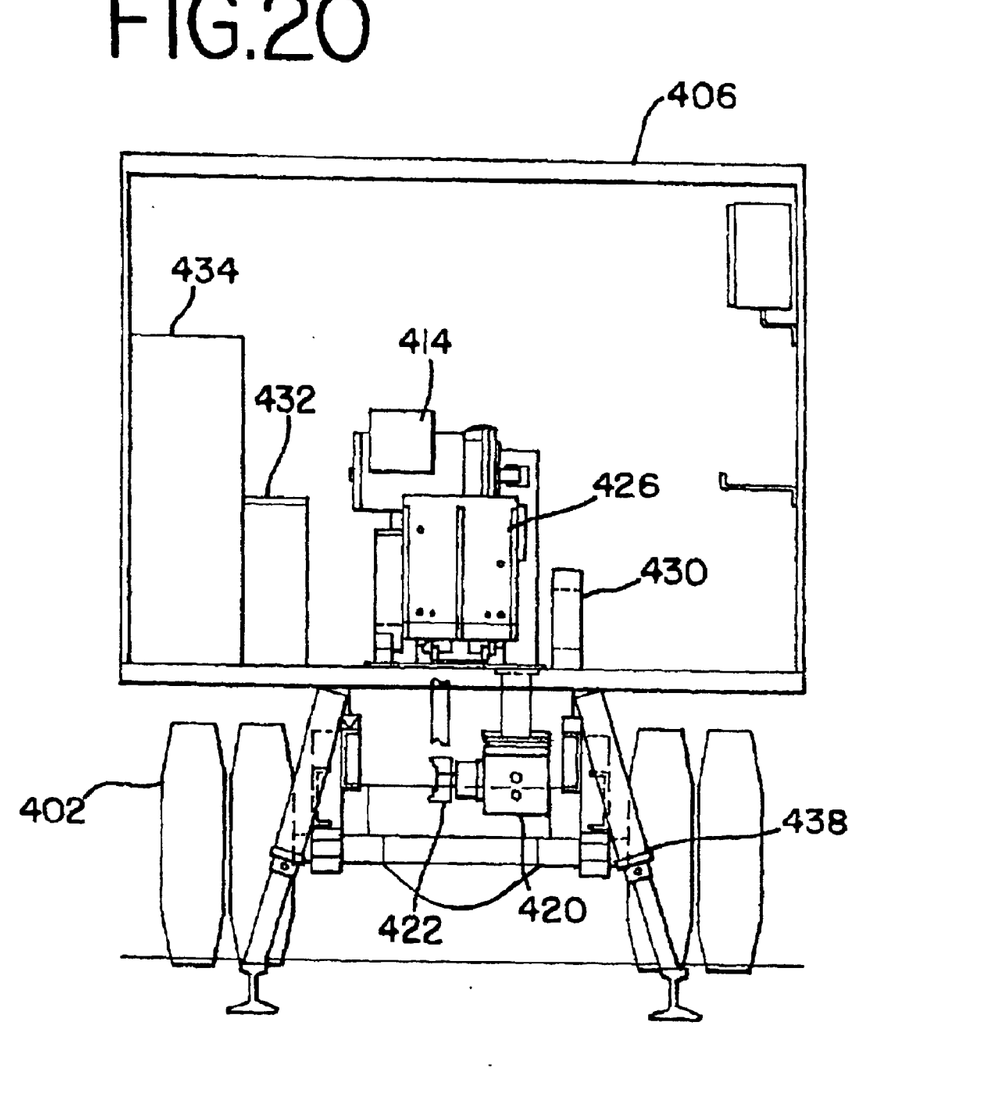
FIG. 20 is a rear elevation of the alternate embodiment of the weld delivery unit.

The cargo box can be stabilized, as shown in FIG. 20, by use of external stabilizer legs 438 which are hydraulically operated to keep the cargo box from swaying.

The portable welding robot 500, best shown in FIGS. 23 and 24, is mounted to the rail restraint 201 which increases the accuracy of the robot 500 during weld orientation and operation. It will be seen that the robot, as is known to one in the robotics art, has a base 430 mounted to rotational bearing 432 which enables the robot to rotate around a rotational axis 434. As is typical of robot devices, robot 500 has articulated arm 436 which is articulated to bearing 432 and base 430 having a series of joints 438 and, for this application, terminates in welder head 440. While the robot 408 is typical in that it operates in three dimensions using controller 410, the ability to remotely place the robot at a specific weld location provides a major departure from known art. This portability provides considerable advantages when used in the field as a robotic welding head 508. Instead of a workpiece being brought to and located proximate a fixed robot, this apparatus brings the welder to the workpiece—in this case railroad rails 28—and uses interfacing with rails 28 to automatically weld the rails 28. The use of touch sensing enables controller 116 to precisely align and operate the welder head 440 to form a precisely controlled and metallurgically sound weld on extremely long rails and in very tight spaces.

The robotic welding head 508 may be loaded onto the welding skid 506 for transportation, and storage. It may also be unloaded and extended for maintenance or for welding of the rails. The robot 500 welding range from the weld delivery unit is only limited by the length of the umbilical 510. Thus the robot 500 can be readily and quickly stored or deployed for use. The portable welding robot 500 could function as a stand-alone device or be temporarily clamped to the rail restraint 201 for welding. The joined rail restraint 201, portable welding robot 500, weld containment device 290 and the protection shield 512 function together as the robotic welding head 508. As a combined unit, the robotic welding head 508 can restrain the rails, contain and produce the weld. The robotic welding head 508 functions with the aid of an umbilical 510 that extends from the robotic welding head 508 to the weld delivery unit 100. The umbilical 510 is a flexible group of cables that enable the robotic welding head 508 to make the weld. The welding skid contains the robot controller 514, shielding gas 516, hydraulics 518, compressed air 520, welder power leads 522, grounding cable 524, induction heater 526, boom 504 and coolant hoses 528. The materials located on the skid supply the robotic welding head 508 through the use of the umbilical 510. The welding robot 500 and rail restraint 201 can be separated for easier handling by employees or can be moved as a one piece unit by using the boom. If the weld location is such that the robotic welding head 508 cannot be placed by use of the boom 504 then the welding robot 500 and the rail restraint 201 can separated and carried to the weld site. Alternatively, the welding skid 506 can be outfitted with multiple robotic welding heads 508 so several weld gaps can be welded simultaneously. The ability to weld several gaps at the same time is desirable in high rail traffic areas such as on commuter lines where trains travel on strict schedules. Delay in replacing turnouts, switches or frogs can tie up rail lines interrupting train schedules.

The protection shield 512 is attached to the rail restraint 201 and can be made out of plexiglass or other weather shielding material. During welding, the protection shield is moved to the closed position, which encloses the weld area, protecting the welding robot 500 and the weld from wind and other elements which may affect the accuracy of the welding procedure.

The robotic welding head 508 is positioned at the weld gap by first removing it from the weld delivery unit 100 by using the boom 504. The robotic welding head 508 is positioned over the weld gap and the rail restraint 201 is fastened to the rail 28 by use of the clamping members. Once the rail restraint 201 is fastened to the rail 28 the robot controller 116 located on the weld delivery unit 100 instructs the robot 500 to determine the rail gap configuration and then maneuvers the robot 500 to create the weld. By being able to place the robotic welding head 508 within a close proximity to the weld gap, set-up is simplified and the time required is greatly reduced. By attaching the portable welding robot 500 to the rail restraint 201, welding accuracy is greatly improved because a smaller, lighter robot can be used which decreases undesired movements during welding. Also, since the portable welding robot 500 is directly clamped to the rail 28, steadying devices and proximity adjustments are eliminated.

As many and varied modifications of the subject matter of this invention will become apparent to those skilled in the art from the detailed description given hereinabove, it will be understood that the present invention is limited only as provided in the claims appended hereto.

We claim:

1. A rail restraining, weld containment, robotic welding apparatus and weld delivery apparatus for enabling the joining of a first rail end and a second rail end, each end being formed in a sectional profile with a rail base, a rail web and a rail head, said apparatus comprising:

a first frame for supporting a clamp, a robotic welding apparatus and a weld containment apparatus and adapted for aligning a welding head;

said clamp adapted for restraining the first and second ends;

said weld containment apparatus connected to said clamp and engageable with said ends by movement having a pivotal and longitudinal component;

a mobile weld delivery unit delivering materials through an umbilical to said robotic welding apparatus having a welding device proximate said ends so that a weld can be made joining said ends.

2. The weld delivery unit of claim 1 further comprising:

said mobile weld delivery unit comprising a separate body and robotic welding apparatus;

said mobile weld delivery unit carrying said rail restraint, wherein said rail restraint has said weld containment apparatus and said robotic welding apparatus releasably attached thereto;

said rail restraint and said attachments being retractably and deployably carried in said body;

said robotic welding apparatus being connected to said mobile weld delivery unit by use of a coupling;

said robotic welding apparatus being automatically controlled by a controller through said coupling, said controller calibrating the operation of said weld relative to the location of said rails.

3. The weld delivery unit of claim 2 further comprising:

said weld operation calibration being performed based on touch sensing different locations on said rails.

4. The weld delivery unit of claim 3 further comprising:

said controller coacting with said robotic welding apparatus through said umbilical to position a welding device based on said calibrated reference;

said robot welding apparatus having a base and a main axis, said main axis being aligned with the longitudinal axis of said rail.

5. The weld delivery unit of claim 4 further comprising:

said weld delivery unit including an induction heater for preheating said rails prior to welding.

6. The induction heater of claim 5 further comprising, said induction heater is usable for post weld heat treating.

7. A rail restraining apparatus for enabling the joining of a first rail end and a second rail end, each end being formed in a sectional profile with a rail base, a rail web and a rail heads said apparatus comprising;

a first frame for supporting a clamp and adapted to support a weld containment apparatus and having an alignment fixture;

said first frame having a fixed downwardly depending arm and a movable downwardly depending arm spaced therefrom defining a rail receiving space therebetween;

said movable arm being eccentrically pivoted on said first frame to enable capturing of a rail in said space;

said clamp adapted for restraining the first and second ends;

said fixture being formed and arranged for receiving and providing a base for a robotic welding apparatus;

said welding apparatus moves in a selected pattern during the welding operation, said movement being automatically controlled.

8. The rail restraint of claim 7 further comprising:

said movable arm being pivoted about a first pivot and a clamping force being applied to and released from a second pivot displaced from said first pivot.

9. A rail weld delivery apparatus for enabling the joining of a first rail end and a second rail end, each end being formed in a sectional profile with a rail base, a rail web and a rail head, said apparatus comprising:

a mobile weld delivery unit delivering a rail restraint, a weld containment apparatus and a robotic welding apparatus having a welding device proximate said ends so that a weld can be made joining said ends;

said mobile weld delivery unit attachable to a body or container;

said robotic welding apparatus is connected to said mobile weld delivery unit by use of a coupling;

said robotic welding apparatus, having a robotic arm, performs a welding operation by starting said robotic arm at a calibrated point and moving said robotic arm in a controlled pattern while welding;

said robotic arm movement while welding being automatically controlled by a controller through said coupling, said controller calibrating the operation of said weld relative to the location of said rails.

10. The weld delivery unit of claim 9 further comprising:

said weld operation calibration being performed based on touch sensing different locations on said rails.

11. The weld delivery unit of claim 10 further comprising:

said controller coacting with a robotic welding apparatus through an umbilical to position a welding device based on said calibrated reference;

said robotic welding apparatus having a base and a main axis, said main axis being aligned with the longitudinal axis of said rail.

12. The weld delivery unit of claim 11 further comprising:

said weld delivery unit including an induction heater for preheating said rails prior to welding.

13. The induction heater of claim 12 further comprising, said induction heater is usable for post weld heat treating.

14. A robotic welding apparatus for enabling the joining of a first rail end and a second rail end, each end being formed in a sectional profile with a rail base, a rail web and a rail head comprising:

said robotic welding apparatus being connectable to a rail wherein said robotic welding apparatus having a base and main axis, said main axis being aligned with the longitudinal axis of said rail, said robotic welding apparatus having a robotic arm that can be programmed to weld together said first rail end and said second rail end.

15. The robotic welding apparatus in claim 14 further including an umbilical attached to a weld delivery unit wherein said umbilical transmits information to and from said weld delivery unit and further transfers welding materials to said robotic welding apparatus.

16. The robotic welding apparatus in claim 15 further including an attachment so said robotic welding apparatus can be releasably attached to a rail restraint device.

17. The robotic welding apparatus in claim 16 wherein movement of said robotic welding apparatus while welding is being automatically controlled by a controller through said umbilical, said controller calibrating the operation of said weld relative to the location of said rails;

said weld operation calibration being performed based on touch sensing different locations on said rails.

18. The robotic welding apparatus in claim 15 further including an attachment so said robotic welding apparatus can be releasably attached to one of a rail restraint device or a weld containment device.

19. The robotic welding apparatus in claim 15 further including an attachment so said robotic welding apparatus can be releasably attached to a rail restraint device and a weld containment device.

* * * * *